(12) United States Patent
Culibrk et al.

(10) Patent No.: US 11,074,161 B2
(45) Date of Patent: Jul. 27, 2021

(54) OPTIMIZED TEST CASE SELECTION FOR QUALITY ASSURANCE TESTING OF VIDEO GAMES

(71) Applicant: Electronic Arts, Inc., Redwood City, CA (US)

(72) Inventors: Milan Culibrk, Coquitlam (CA); Alexander Senchenko, Langley (CA); Dan Ispir, Bucharest (RO)

(73) Assignee: Electronic Arts Inc., Redwood City, CA (US)

( * ) Notice: Subject to any disclaimer, the term of this patent is extended or adjusted under 35 U.S.C. 154(b) by 18 days.

(21) Appl. No.: 16/369,674

(22) Filed: Mar. 29, 2019

(65) Prior Publication Data

US 2020/0310948 A1    Oct. 1, 2020

(51) Int. Cl.
  *G06F 11/36*    (2006.01)
  *G06F 17/18*    (2006.01)
  *G06N 20/00*    (2019.01)
  *G06N 7/00*    (2006.01)

(52) U.S. Cl.
  CPC ...... *G06F 11/3684* (2013.01); *G06F 11/3688* (2013.01); *G06F 11/3692* (2013.01); *G06F 17/18* (2013.01); *G06N 7/00* (2013.01); *G06N 20/00* (2019.01)

(58) Field of Classification Search
  CPC ............ G06F 11/3684; G06F 11/3688; G06F 11/3692; G06F 17/18; G06N 20/00; G06N 7/00
  See application file for complete search history.

(56) References Cited

U.S. PATENT DOCUMENTS

| | | | | |
|---|---|---|---|---|
| 5,500,941 A * | 3/1996 | Gil | ...................... | G06F 11/3684 714/38.1 |
| 5,805,795 A * | 9/1998 | Whitten | .............. | G06F 11/3672 714/32 |
| 7,178,063 B1 * | 2/2007 | Smith | ................. | G06F 11/3688 714/38.1 |
| 8,276,123 B1 * | 9/2012 | Deng | .................... | G06F 11/368 717/125 |

(Continued)

OTHER PUBLICATIONS

Suri et al., "Implementing Ant Colony Optimization for Test Case Selection and Prioritization" (Year: 2011).*
Mirarab et al., "Size-Constrained Regression Test Case Selection Using Multicriteria Optimization" (Year: 2012).*
Jiang et al., "Adaptive Random Test Case Prioritization" (Year: 2009).*

(Continued)

*Primary Examiner* — Phillip H Nguyen
(74) *Attorney, Agent, or Firm* — Lee & Hayes, P.C.

(57) ABSTRACT

A test case selection system and method uses a test selection model to select test cases from a library of test cases to be used for quality assurance (QA) testing of a software application to maximize the chances of finding bugs from executing the selected test cases. The test case selection model may be a machine learning based regression model trained using outcomes of previous QA testing. In some case, the test case selection system may provide periodic and/or continuous refinement of the test case selection model from one QA testing run to the next. The model refinements may include updating weights associated with the test case selection model in the form of a regression model. Additionally, the test case selection system may provide performance analytics between a test case selection model-based selection of test cases and random selection of test cases.

20 Claims, 7 Drawing Sheets

(56) References Cited

U.S. PATENT DOCUMENTS

| | | | | |
|---|---|---|---|---|
| 9,811,074 | B1* | 11/2017 | Aichele | G06N 7/04 |
| 10,019,347 | B2* | 7/2018 | Evans | G06F 11/3684 |
| 10,282,283 | B2* | 5/2019 | Finger | G06F 11/3692 |
| 10,613,857 | B2* | 4/2020 | Hsiung | G06F 11/3684 |
| 10,642,722 | B2* | 5/2020 | Li | G06F 11/368 |
| 10,671,516 | B2* | 6/2020 | Nie | G06F 11/3664 |
| 2007/0240113 | A1* | 10/2007 | Rosaria | G06F 11/3696 |
| | | | | 717/124 |
| 2009/0222647 | A1* | 9/2009 | Feng | G06F 9/3851 |
| | | | | 712/227 |
| 2019/0065182 | A1* | 2/2019 | Hsiung | G06F 8/77 |
| 2019/0196952 | A1* | 6/2019 | Manchiraju | G06N 3/088 |

OTHER PUBLICATIONS

Chittimalli et al., "Regression Test Selection on System Requirements" (Year: 2008).*
Graves et al., "An Empirical Study of Regression Test Selection Techniques" (Year: 2001).*
Kukreja et al., "Randomizing Regression Tests using Game Theory" (Year: 2013).*
Al-Refai et al., "Model-based Regression Test Selection for Validating Runtime Adaptation of Software Systems" (Year: 2016).*
Leung et al., "A Cost Model to Compare Regression Test Strategies" (Year: 1991).*

* cited by examiner

OPTIMIZED TEST CASE SELECTION FOR QUALITY ASSURANCE TESTING OF VIDEO GAMES

BACKGROUND

Quality Assurance (QA) testing of software, particularly video games, is used to ensure no or low defects in software products. In recent years, as software, and in particular video games, have become more complex there are a large number of elements to test during the QA process. Often QA testing may be performed concurrently with the software product development. In some cases, testing all elements of a video game is difficult and/or cost prohibitive. This is because there may be a large number of items that could be tested which is beyond what is reasonable to test. In many cases, a QA manager may select or direct test cases to be selected for testing for a video game. Such mechanisms for testing video games may be subjective and may not necessarily produce an efficient set of test cases for effectively testing the video game.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
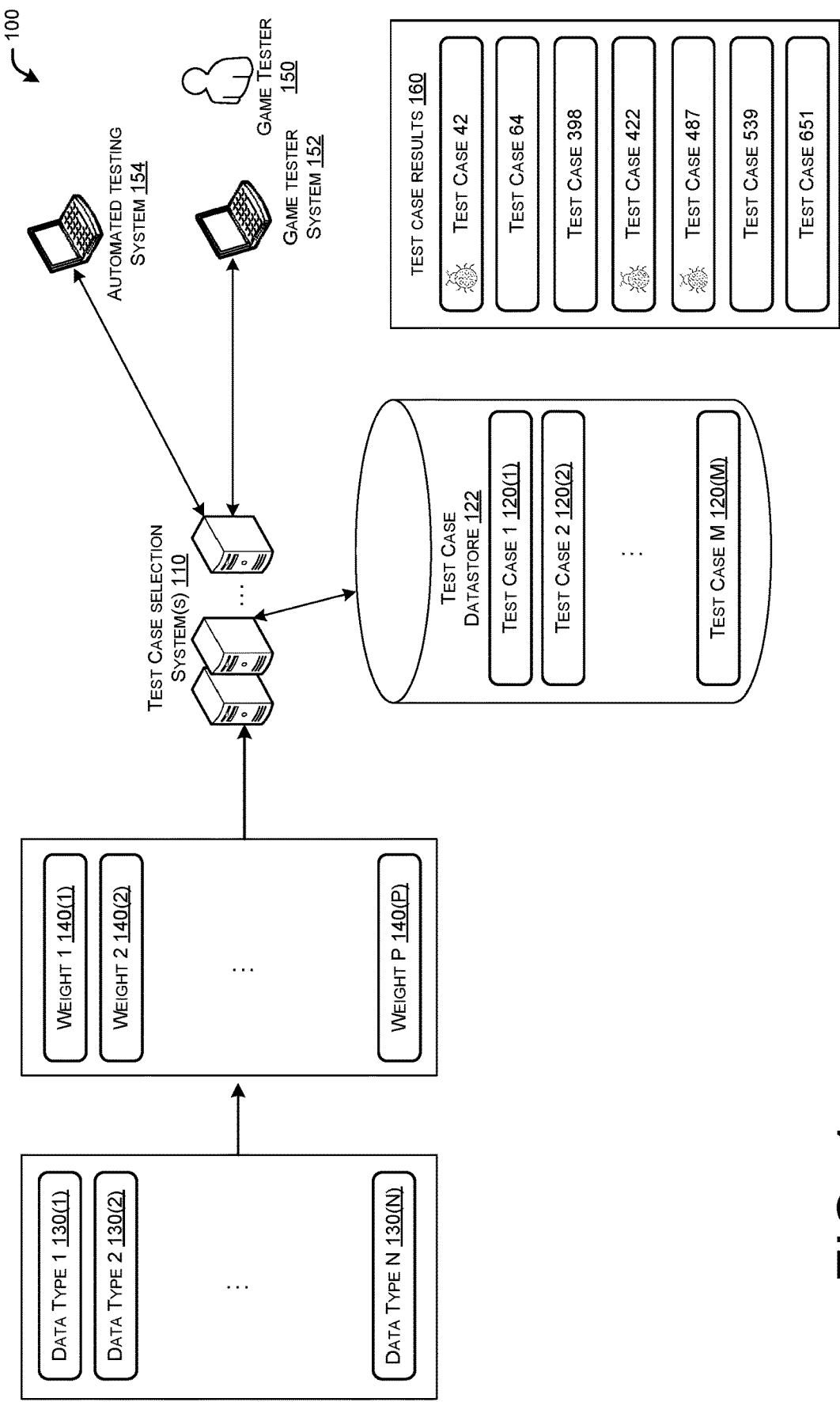
FIG. 1 illustrates a schematic diagram of an example environment with test case selection system(s) to select test cases to be tested, in accordance with example embodiments of the disclosure.

Example embodiments of this disclosure describes methods, apparatuses, computer-readable media, and system(s) for selecting, from a library of test cases, test cases that are to be tested for a software product, such as a video game.

According to example embodiments, a test case selection system may select test cases to be tested based at least in part on a deterministic model, or test case selection model, that is based on human (e.g., quality assurance (QA) manager) and/or machine learning input. For example, a QA manager and/or machine learning algorithm may set weights for a test case selection model (e.g., regression model) for selection of the test cases, from the library of test cases, to be tested.

Due to high complexity of video games and other software applications, there may be a large number of test cases, and often times, the number of test cases are great enough that it may be operationally difficult, economically prohibitive, and/or generally impractical to test the video game using all of the available test cases. Thus, test cases may be selected from a repository of possible test cases, such as by the use of a deterministic model, referred to as a test case selection model. Since all of the available test cases may not be tested, it may be advantageous to select test cases that are most likely to result in detection of an error, referred to herein as a bug. Mechanisms that are effective in selecting test cases that result in greater numbers of bugs detected, therefore, may result in a more efficient and effective QA testing process.

When test cases are selected for testing, such as by the mechanisms disclosed herein, the test cases may be indicated to one or more testing entities. These testing entities may include an automated testing system and/or a human game tester who may perform the test case on a game tester system. When test cases are assigned to either a human tester or an automated tester, the testing entity may perform the indicated tests and report back outcomes of the tests, such as any bugs found. A discussed herein, the QA testing may be more effective if the selection of test cases to be tested by the testing entities are those that are more likely to generate bug reports. Some disclosed embodiments provide mechanisms to generate analytics to indicate how effective a particular test cases selection is, as well as provide revisions or updates to test cases selection models to improve the effectiveness of QA testing.

To increase the likelihood of detected bugs from QA tests run, QA managers may direct the selection of test cases, such as by way of influencing a test case selection model, that are most likely to result in the detection of a bug. However, in many cases, it is not known how well the QA manager has performed with respect to selecting test cases that result in a greater number of bug reports compared to non-selected test cases. According to example embodiments of the disclosure, the performance of a test case selection model may be determined, particularly to the extent to which the selections are likely to result in detected bugs. Additionally, the detection of bugs may be used to refine test selection models, such as by way of machine learning models, to increase the effectiveness of the test case selection models.

According to example embodiments, the performance of the selection of test cases by the test case selection model, such as a human-influenced deterministic model, may be compared to performance of test cases selected by random selection by a test case selection system. Analytics and metrics may be generated by the test case selection system to indicate the effectiveness of the test case selection model, such as a test case selection model based at least in part on a QA manager's inputs, compared to random selection of test cases to be tested. Additionally, according to example embodiments, the test case selection system may use machine learning and/or artificial intelligence to generate and/or update test case selection models for the selection of test cases that are to be used for testing the video game using outcomes from one or both of the test cases selected by the test case selection models and/or random selection. In this way, the test case selection models may be updated in a systematic and data-driven manner, rather than based on a less effective human-derived deterministic model for the selection of test cases.

In some cases, the test case selection models and/or the weights thereof may be continuously and/or periodically updated by the test case selection systems using machine learning models, such as regression models, in a feedback mechanism. Further still, in example embodiments, the performance of updated test case selection models may be compared to a previous iteration of the test case selection models. This comparison may be based at least in part on analytics and/or metrics determined by the test case selection system.

There may be a set of inputs of different data types that represent a variety of factors associated with various portions of the video game. These data types, for example, may indicate various aspects associated with functions of the video game and/or the computer code associated with those functions. Some data types may include the complexity of particular blocks of code, the number of lines of code for a particular block of code, the backlog of work from a particular group that generates certain portions of the software, etc. These data types may be weighted, according to the test case selection model, to generate a function output to select test cases that are to be tested. The test case selection model, therefore, may be defined by weights associated with the data types. In some cases, these weights may include coefficient multipliers of corresponding data types to generate an output of the test case selection model. This output may then be used, such as by comparing to a threshold value, to select test cases to use to test the video game.

As discussed herein, the weights of the test case selection models may be set and/or guided by a human (e.g., QA manager). In this case, the QA manager may make assumptions of what data types may warrant a heavier or lower weight in the selection of test cases that are most likely to result in bug reports. Such a process may be subjective and iterations to the process may not always be data driven. Thus, according to example embodiments of the disclosure, the test selection models may be generated by and/or modified by machine learning algorithms, such as regression analysis, where the outcomes of the test cases (e.g., bug detected or no bug detected) may be used as training data for the machine learning algorithms. In this way, the machine learning models may be used to generate more effective test case selection models by setting and/or modifying the weights within the test case selection models. According to example embodiments of the disclosure, machine learning generated and/or machine learning modified test case selection models may be deployed for future selection of test cases for QA testing.

Although machine learning test case selection models are discussed in the context of regression modeling, it should be understood that any suitable type of machine learning model may be used to generate and/or refine the test case selection models. For example, the test case selection model may include a decision tree model, a gaussian tree model, a Bernoulli model, a random forest model, or the like. Indeed, in other examples, the test case selection models may include any other type and/or number of models and/or combinations of models. Other models that may be used as test case selection models may include, for example, linear regression models, neural network models, Bayesian network models, any variety of heuristics (e.g., genetic algorithms, swarm algorithms, etc.), combinations thereof, or the like. These test case selection models may be trained using training data that may include outcomes (e.g., detection of a bug or not) from test cases selected in previous rounds of testing.

When a QA manager sets the weights of the test case selection models, it may be difficult to determine whether the human derived model is effective in its intended objective of maximizing the number of bugs detected or expected to be detected from a set number of test cases performed. To this extent, the test case selection systems may select random test cases and compare the performance of those randomly selected test cases to the test cases selected according to the test case selection models, such as test case selection models weighted by a human. In this way, analytic data and metrics may be used to assess whether a QA manager really is adding value when selecting weights associated with the test case selection models.

In example embodiments, there may be a continuous and/or periodic refinement of the weights of the test case selection models over time based at least in part on the outcomes of test cases tested in previous iterations of testing. The feedback-based test case selection model refinement may provide periodic refinement of the test case selection models. In some cases, whenever test cases are selected and tested, the outcomes of the testing may be used as training data to refine the test case selection model for the next set of testing of the video game. In this way, a machine learning driven feedback loop may provide for refinement over time in the selection of test cases for a software application that may be subjected to multiple rounds of testing. Furthermore, the refinements to the test case selection models may be applied to other similar software products to be tested.

In some example embodiments, the test case selection models, as disclosed herein, may provide feedback to parameters for performing certain test cases. For example, test cases, such as those run by automated systems (e.g., test scripts, bots, etc.) or by humans, that may describe aspects of how to test the video game. The test case selection models may provide feedback as to any suggested changes to parameters pertaining to test cases. For example, parameters related to where to shoot (e.g., which direction to shoot) in testing a shooting video game may be specified by machine learning algorithms.

Although examples in the realm of video games and online gaming are discussed herein, it should be understood that the QA testing, as described herein, may be applied to any variety of software applications including other entertainment software, business software, banking software, operating systems, application software, enterprise resource software, cloud management software, mobile device software, scientific software, combinations thereof, or the like.

It should be understood that the systems and methods, as discussed herein, are technological improvements in the field of quality assurance (QA) and software testing. For example, the methods and systems as disclosed herein enables computing resources for improved QA testing, such as for video games, by more efficiently selecting test cases for software testing. These improvements manifest in more efficient computing resource and human resource utilization, such as more efficient software testing activities. Additionally, the improvements in QA testing, as disclosed herein, may allow for higher quality software with lower levels of defects and/or errors. Thus, the disclosure herein provides improvements in the functioning of computers to provide improvements in the technical field of video compression and embedded video applications, such as video games. Additionally, the technological problems addressed here are ones that arise in the computer-era and the Internet-era, such as in the fields of online gaming and video games. Thus, not only is the disclosure directed to improvements in computing technology, but also to a variety of other technical fields related to video games and software testing.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with test case selection system(s) 110 to select test cases to be tested, in accordance with example embodiments of the disclosure. The example environment 100 may include one or more test case(s) 120(1), 120(2), . . . 120(N), hereinafter referred to individually or collectively as test case 120 or test cases 120. The test cases 120 may define a test operation to be performed on a video game or other software. In example embodiments, a library test cases 120 may be stored in a test case datastore 122 that may be accessible by the test case selection system(s) 110.

The environment may also include one or more data types 130(1), 130(2), . . . 130(N), hereinafter referred to individually or collectively as data type 130 or data types 130, that may be input to a test selection model defined by one or more weights 140(1), 140(2), . . . 140(N), hereinafter referred to individually or collectively as weight 140 or weights 140. The test case selection system(s) 110 may be configured to receive the data types 130 as input data and use the test case selection model, as defined by the weights 140, to select test cases 120 from the test case datastore 122 as test cases to be tested. The selected ones of the test cases 120 may be indicated by the test case selection system(s) 110 to a game tester 150 via his or her game tester system 152 and/or to an automated testing system 154 to be tested. The game tester 150 on his or her game tester system 152 and/or the automated testing system 154 may provide test case results 160.

The test cases 120 may define a set of operations that are to be conducted by the automated testing system 154 and/or the game tester. These operations may be of any suitable level of complexity and are intended to identify if a particular feature of the video game is functional or contains an error, referred to herein as a bug. For example, a test case may define the operations of starting up the video game to be tested and once running, shut down the video game. Performing this set of functions may allow determination of whether there is a bug in the functionality of starting up and/or shutting down the video game. The operations of the test case may be linked to and enabled by one or more blocks of computer code of the video game. A software or video game developer may use the test case result 160, such as a bug report to fix any errors in the one or more blocks of computer code associated with the operation of the test case.

Another example of a test case 120 in a racing game may be to race a car once around a particular racetrack. In this example, the game tester 150 and/or automated testing system 154 may perform the test and indicate any bugs that he or she may encounter in the video game. The game tester 150 and/or automated testing system 154 may document details of any detected bug, such as when it was detected (e.g., time into the start of the race), where it was detected (e.g., which part of the race track), what was the nature of the bug (e.g., video game crashes, the sound is wrong, there are graphics artifacts, cars overlap without detecting a crash, etc.). Again, the operations of the test case may be linked to and enabled by one or more blocks of computer code of the video game, and a developer can use a bug report from the running of the test case to debug the corresponding blocks of code.

Yet another example of a test case in an American football video game may be to start the game, select a first player as quarterback and a second player as a receiver, start game play, and pass the football from the quarterback to the receiver. Again, the testing entity (e.g., game tester 150 or automated testing system 154) may perform the operations of the test case and provide an indication of whether a bug was detected, and if so, what the nature of the bug was. Again, the game tester 150 and/or automated testing system 154 may document details of any detected bug, such as when it was detected (e.g., time into the start of the game or from when the football was snapped), where it was detected (e.g., 47 yard line), what was the nature of the bug (e.g., pass was dropped when it should have been caught, pass was caught when it should have been dropped, no penalty on the play when there should have been a penalty, graphics messed up, etc.). Again, this information may be used by a video game developer to fix any problems with computer code of the video game.

As discussed herein, modern video games and other software applications may be at a level of complexity where there may be a large number of test cases 120 that could be tested. In fact, the number of different test cases 120 may be larger than what can practically be tested during the video game development process. As a result, the test case system(s) 110 may select a subset of test cases 120 for testing in any given QA testing run. The selection of the test cases 120 to be tested may be driven by the test case system(s) 110 based at least in part on the data types 130 and the weights 140. In example embodiments, a QA test objective may be to select test cases 120 that are most likely to generate a test case result 160 of finding of a bug and/or producing a bug report.

The data types 130 may be individual data elements that are descriptive of a feature of a functionality within the video game. For example, a particular functionality of a video game may be linked to (e.g., enabled by) a particular block of code. There may be available data types 130 that indicate the number of lines of code of the particular block of code, a numerical indicator of the complexity of the particular block of code and/or the particular functionality, a numerical indicator of work backlog of the developer team that generated the particular block of code, the location of the developer team that generated the particular block of code, etc. Without providing an exhaustive list of metrics that the may be indicated about functionalities of the video game, corresponding groupings of computer code, and/or corresponding hardware used by the functionality, there may be any variety of data types 130 descriptive of the functionalities, associated computer code, associated hardware invoked, associated business groups responsible for the functionalities, etc.

The weights 140 may be any suitable weights corresponding to the data types 130 for selecting particular ones of the test cases 120 for the purposes of QA testing. The weights 140, in example embodiments, may be coefficients of a test case selection model in the form of a regression model. In other words, various data type values may be multiplied by corresponding weights 140 to generate a functional value from the test case selection model that may be used to determine if a particular test case is to be used for QA testing. For example, consider a special situation with two test cases from which to select for QA testing. The function value from the test case selection model associated with the first test case may be lower than a threshold value and the function value of the test case selection model associated with the second test case may be greater than the threshold value. If only test cases above a threshold level are to be used for testing, then the second test case may be selected for testing and the first test case may not be selected for testing. In this way, the weights 140, as part of the test case selection model, allows for the selection of test cases 120 from the collection of all test cases 120.

The weights 140, in some cases, may be selected and/or influenced by a human, such as a QA manager. This type of human based weighting of the test case selection models may rely on intuition, rather than being data-driven. According to example embodiments, the weights 140 may be generated by training a machine learning model, such as a regression model. The test cases system(s) 110 may use test case results 160 to train machine learning models to determine the weights 140 and use those weights 140 for the purposes of subsequent QA testing on the same or similar video game products.

The automated testing systems 154 and/or game tester systems 152 may be any suitable system on which test cases 120 can be performed to test the video game. These systems 154, 152 may receive instructions to perform certain test cases 120 from the test case selection system(s) 110. The systems 154, 152 may be any suitable device, including, but not limited to a Sony Playstation® line of systems, a Nintendo line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like.

In general, the systems 152, 154 may receive a list of test cases 120 to use for QA testing. Along with the test cases, testing parameters may be received that define aspects of the test cases 120. For example, for a test where an avatar is to walk through around a playing field, the parameters may define how long to walk around or indicate how much distance or what direction to walk. In general, such test parameters may provide specific information regarding how to conduct the tests according to the test case 120 being tested.

According to example embodiments, the test case selection system(s) 110 may receive inputs, as the data type 130 and use the weights 140 to make a determination of test cases 120 to select for QA testing. The test case selection system(s) 110 may then receive outcomes, or the test case results 160 from the automated testing systems 154 and/or game tester system 152. The test case results 160 may indicate whether a bug was detected from testing using a test case. The detection of a bug may be indicated in FIG. 1 by the icon of a bug. For example, testing using "Test Case 42," "Test Case 422," and "Test Case 487" may have resulted in detecting a bug. The test case names and the number of test cases, as tested, shown here are examples, and any suitable test case name and/or number of tests may be used, according to example embodiments. In some cases, there may be more than one bug detected for a test case. Additionally, the testing may also result in a bug report that includes additional information about any detected bug(s), such as where, when, what, or how a bug was detected.

The test case selection system(s) 110 may be able to use the outcomes of testing, such as the test case results 160, to generate refined weights 140 to deploy as a new test case selection model. Although machine learning test case selection models, and related weights 140, are discussed in the context of regression modeling, it should be understood that any suitable type of machine learning model may be used to generate and/or refine the test case selection models. For example, the test case selection model may include a decision tree model, a gaussian tree model, a Bernoulli model, a random forest model, or the like. Indeed, in other examples, the test case selection models may include any other type and/or number of models and/or combinations of models. Other models that may be used as test case selection models may include, for example, linear regression models, neural network models, Bayesian network models, any variety of heuristics (e.g., genetic algorithms, swarm algorithms, etc.), combinations thereof, or the like.

These test case selection models may be trained using training data that may include test case results 160 from previous rounds of testing. The test case selection system(s) 110 may be configured to train the test case selection models, as described herein. This training may be supervised, unsupervised, or partially supervised (e.g., semi-supervised). This training may include fitting the weights 140 to select the test case results 160 producing bugs. In example embodiments, the test case selection system(s) 110 may wait to train the test case selection models until a sufficient amount of the training data, such as test case results 160, are available. It should be appreciated that more accurate and robust test case selection models may be generated by using a larger corpus of training data.

Figure 2:
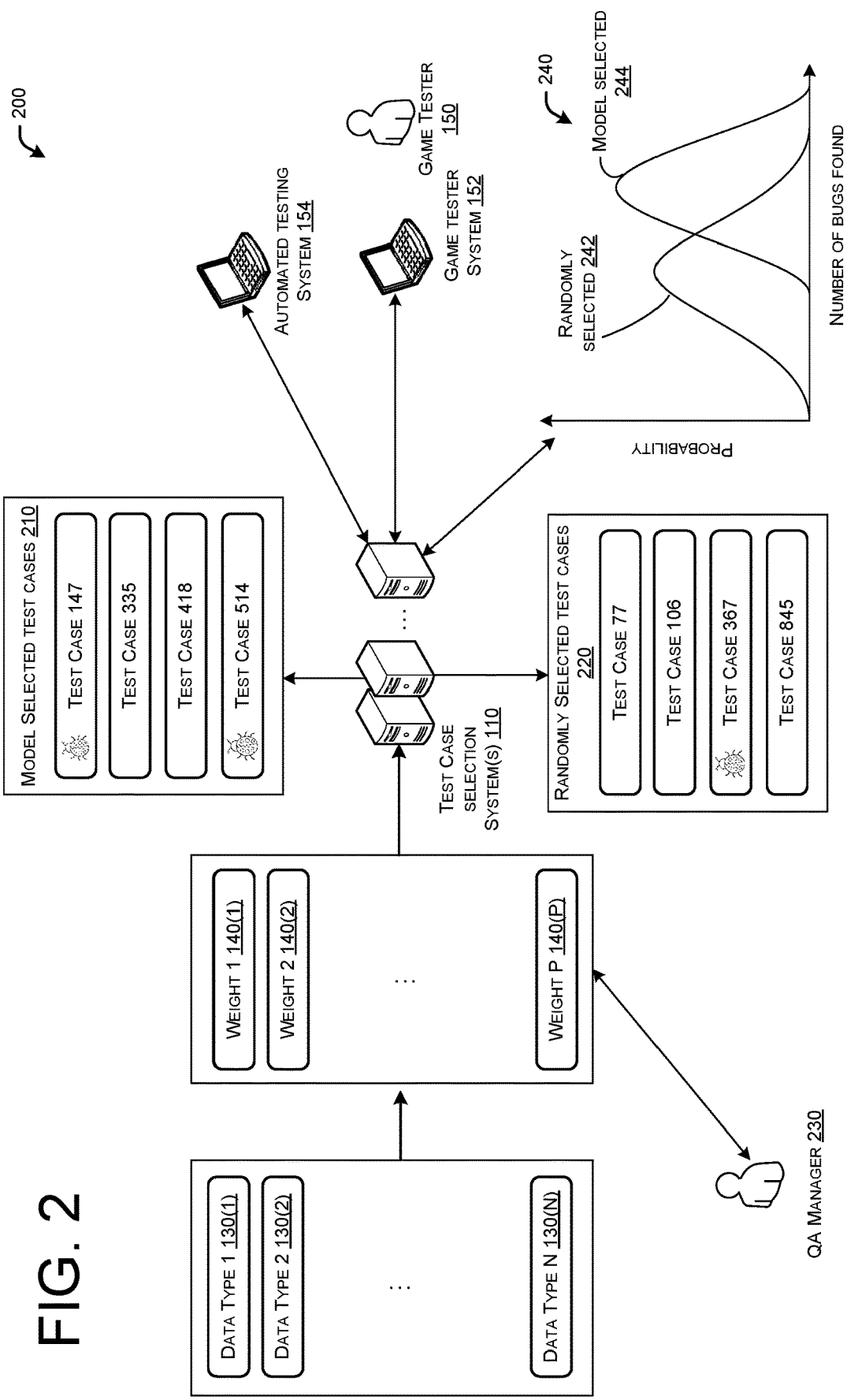
FIG. 2 illustrates a schematic diagram of an example environment with the test case selection system(s) of FIG. 1 to select test cases to be tested according to a test case selection model and according to random selection and provide analytics associated with the selected test cases, in accordance with example embodiments of the disclosure.

FIG. 2 illustrates a schematic diagram of an example environment 200 with the test case selection system(s) 110 of FIG. 1 to select test cases 120 to be tested according to a test case selection model and according to random selection and provide analytics associated with the selected test cases, in accordance with example embodiments of the disclosure.

The test case selection system(s) 110 may determine test case selection model selected test cases 210 to be tested. The model selected test cases 210 may be determined based at least in part on inputs in the form of data type 130, in addition to the weights 140, as disclosed herein. In some cases, the weights 140 may be set and/or influenced by a QA manager 230. The model selected test cases 210 may be indicated to the testing entities (e.g., automated testing system 154 and/or game tester 150 via his or her game tester system 152). The testing may be conducted according to the model selected test cases 210 and the outcomes may be received by the test case selection system(s) 110, such as from the automated testing system 154 and/or the game tester system 152. As indicated here, performing "Test Case 147" and "Test Case 514" may have resulted in a detected bug. Again, the number and/or names of the model selected test cases 210 are examples, and there may be any suitable number of model selected test cases 210 with any suitable naming thereof.

The test case selection system(s) 110 may further determine randomly selected test cases 220 to be tested. The randomly selected test cases 220 may be determined based at least in part on random selection of test cases 120 from the library of test cases 120 by the test case selection system(s) 110. This may entail generation of a random number for selection of the randomly selected test cases 220. The model selected test cases 220 may be indicated to the testing entities (e.g., automated testing system 154 and/or game tester 150 via his or her game tester system 152). The testing may be conducted according to the randomly selected test cases 220 and the outcomes may be received by the test case selection system(s) 110, such as from the automated testing system 154 and/or the game tester system 152. As indicated here, performing "Test Case 367" may have resulted in a detected bug. Again, the number and/or names of the randomly selected test cases 220 are examples, and there may be any suitable number of model selected test cases 210 with any suitable naming thereof.

In example embodiments, the automated test system 154 and/or the game tester 152 may not know whether the test case they are performing is a model selected test case 210 or randomly selected test cases 220. As such, to the extent that there can be bias in performing the test cases 120, there is not likely to be any bias in the performance of the model selected test cases 210 versus the randomly selected test cases 220.

After the automated testing system 154 and/or game tester 150 performs all of the assigned model selected test cases 210 and the randomly selected test cases 220, the test case selection system(s) 110 may receive the outcomes (e.g., test case results 160) from the performance of the model selected test cases 210 and the randomly selected test cases 220. The test case selection system(s) 110 may use the outcomes to generate an analytical comparison 240 of the outcomes form the model selected test cases 210 versus the randomly selected test cases 220. As shown here, the analytical comparison 240 may indicate a probability distribution 242 of detecting a bug from the randomly selected test cases 220 and the probability distribution 244 of detecting a bug from the model selected test cases 210. For example, the probability distributions 242, 244 shown here may be for the same number of randomly selected test cases 220 and model selected test cases 210. In this case, the model selected test cases 210 may be more effective for QA testing than the randomly selected test cases 220.

Although the analytical comparison 240 is shown here as probability distributions 242, 244, it should be understood that any suitable mechanism for providing an analytical comparison of the model selected test cases 210 versus the randomly selected test cases 220 may be used. For example, statistical techniques such as t-test, Chi-squared tests, analysis of variance (ANOVA), combinations thereof, or the like, may be used to compare the model selected test cases 210 and the randomly selected test cases 220.

Figure 3:
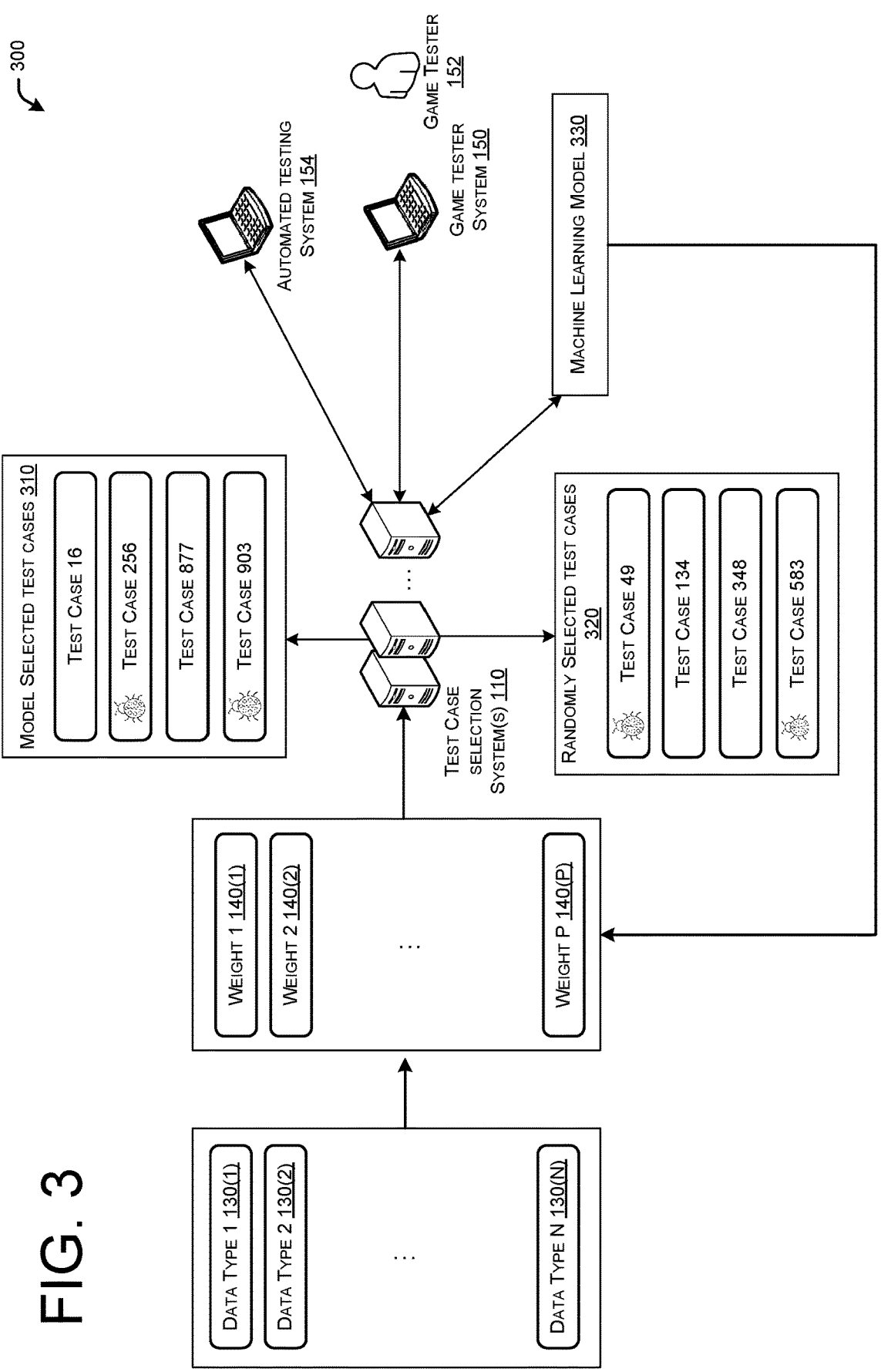
FIG. 3 illustrates a schematic diagram of an example environment with the test case selection system(s) of FIG. 1 to provide machine learning-based updates to a test case selection model for selecting test cases to be tested, in accordance with example embodiments of the disclosure.

FIG. 3 illustrates a schematic diagram of an example environment 300 with the test case selection system(s) 110 of FIG. 1 to provide machine learning-based updates to a test case selection model for selecting test cases to be tested, in accordance with example embodiments of the disclosure.

Similar to environment 200 of FIG. 2, the test case selection system(s) 110 may determine test case selection model selected test cases 310 to be tested. Again, the model selected test cases 310 may be determined based at least in part on inputs in the form of data type 130, in addition to the weights 140, as disclosed herein. In some cases, the weights 140 may be set by a machine learning algorithm (e.g., regression model) or a QA manager 230. The model selected test cases 310 may be indicated to the testing entities (e.g., automated testing system 154 and/or game tester 150 via his or her game tester system 152). The testing may be conducted according to the model selected test cases 310 and the outcomes may be received by the test case selection system(s) 110, such as from the automated testing system 154 and/or the game tester system 152. As indicated here, performing "Test Case 256" and "Test Case 903" may have resulted in a detected bug. As discussed herein, the number and/or names of the model selected test cases 310 are examples, and there may be any suitable number of model selected test cases 310 with any suitable naming thereof.

Again, similar to the environment 200 of FIG. 2, the test case selection system(s) 110 may further determine randomly selected test cases 320 to be tested. The randomly selected test cases 320 may be determined based at least in part on random selection of test cases 120 from the library of test cases 120 by the test case selection system(s) 110. This may entail generation of a random number for selection of the randomly selected test cases 320. The model selected test cases 320 may be indicated to the testing entities (e.g., automated testing system 154 and/or game tester 150 via his or her game tester system 152). The testing may be conducted according to the randomly selected test cases 320 and the outcomes may be received by the test case selection system(s) 110, such as from the automated testing system 154 and/or the game tester system 152. As indicated here, performing "Test Case 49" and "Test Case 583" may have resulted in a detected bug. Again, the number and/or names of the randomly selected test cases 320 are examples, and there may be any suitable number of model selected test cases 310 with any suitable naming thereof.

The outcomes of testing using the randomly selected test cases 320 and/or the model selected test cases 310 may be applied to a machine learning model 330. The machine learning model 330 may be a regression model in some example embodiments. In other example embodiments, the machine learning model 330 may be a different machine learning model used instead of or in addition to a regression model. The machine learning model 330 may generate new and/or refined weights 140 that may be used for future test case selection. In this way, by updating the weights 140, the test case selection models may be updated. As discussed above, in some cases, the original weights 140 were also machine learning derived. In other cases, the original weights may have been QA manager 230 derived, or at least influenced by the QA manager 230.

It should also be noted that the process of revising the test case selection model by updating the weights 140 may be performed solely based on results of the model selected test cases 310. Thus, in example embodiments, there may not be any randomly selected test cases 320, or the randomly selected test cases 32 may not factor in the performance of the machine learning model 330.

Figure 4:
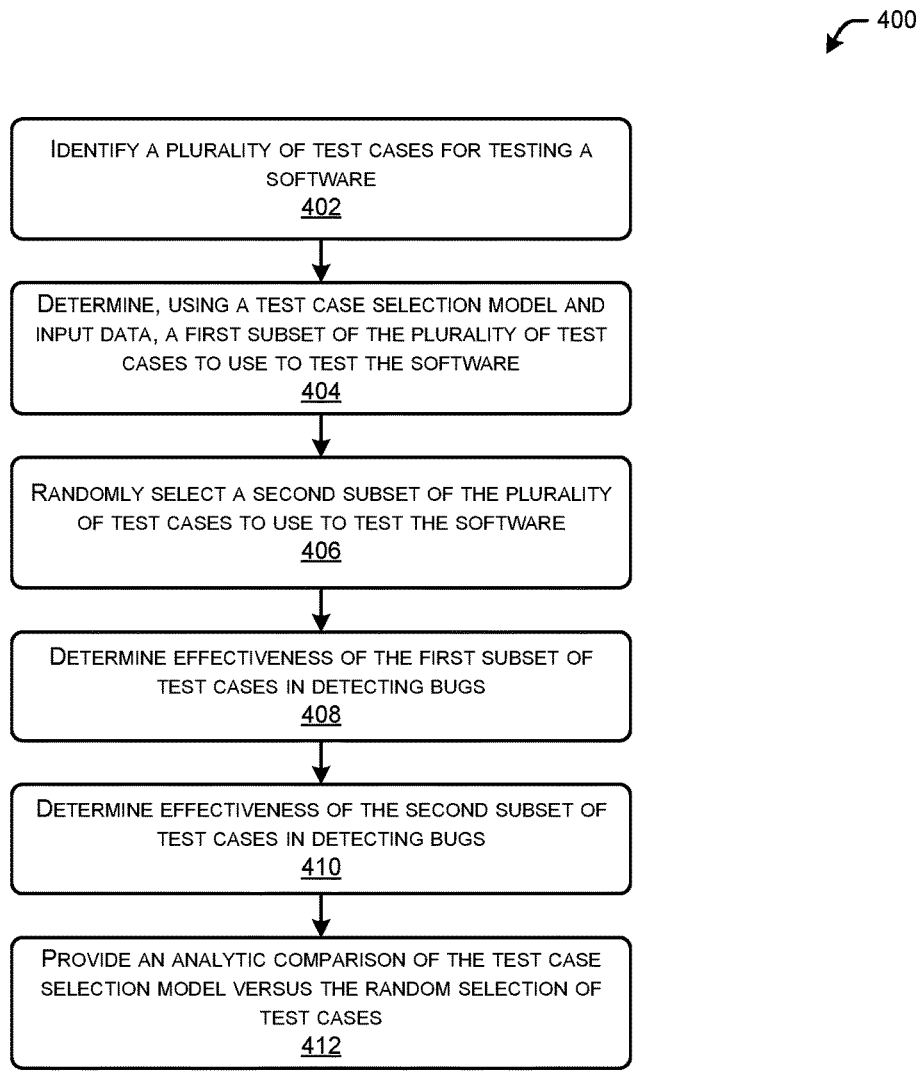
FIG. 4 illustrates a flow diagram of an example method by which performance of test case selection model in selecting test cases to be tested is provided, in accordance with example embodiments of the disclosure.

FIG. 4 illustrates a flow diagram of an example method 400 by which performance of a test case selection model in selecting test cases to be tested is provided, in accordance with example embodiments of the disclosure. The method 400 may be performed by the test case selection system(s) 110, individually or in cooperation with one or more elements of environment 100, 200, 300.

At block 402, a plurality of test cases for testing a software may be identified. The number of the test cases may be too great to be practical for testing all of the test cases. Thus, test cases may be selected for testing. At block 404, a first subset of the plurality of test cases to use to test the software may be determined based at least in part on a test case selection model and input data. The input data, in this case, may be the data type 130. The test case selection model may be based on the weights 140, as disclosed herein.

At block 406, a second subset of the plurality of test cases may be randomly selected to use to test the software. This may entail generating a random number to randomly select the test cases. For example, if approximately one quarter of all the test cases 120 are to be selected for testing, random numbers between 0 and 1 with a normal distribution may be generated associated with each of the test cases 120 and then all of the test cases 120 associated with a random number of greater than 0.75 may be identified as the randomly selected test cases. This is just one example of picking random test cases, and it should be appreciated that any suitable mechanism for randomly selecting test cases may be used.

At block 408, an effectiveness of the the first subset of test cases in detecting bugs may be determined. This effectiveness may be determined based at least in part on received outcomes from the testing using the first subset of test cases. In some cases, a probability of finding a bug based on test case selection model determined test cases. This may entail dividing the number of bugs detected by the total number of test cases in the first subset of test cases. Alternatively, any variety of statistical analysis may be performed to indicate the effectiveness of the first subset of test cases in detecting bugs, including any variety of statistical analysis.

At block 410, an effectiveness of the second subset of test cases in detecting bugs may be determined. This may be similar to the operations described for block 408. At block 412, an analytical comparison of the test case selection model versus the random selection of test cases may be provided. This may entail any suitable statistical comparison to the two selection mechanisms. For example, this comparison may indicate the comparative probability of detecting a bug based on each mechanism for selecting test cases to test. The comparison may further include an indication of the statistical It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
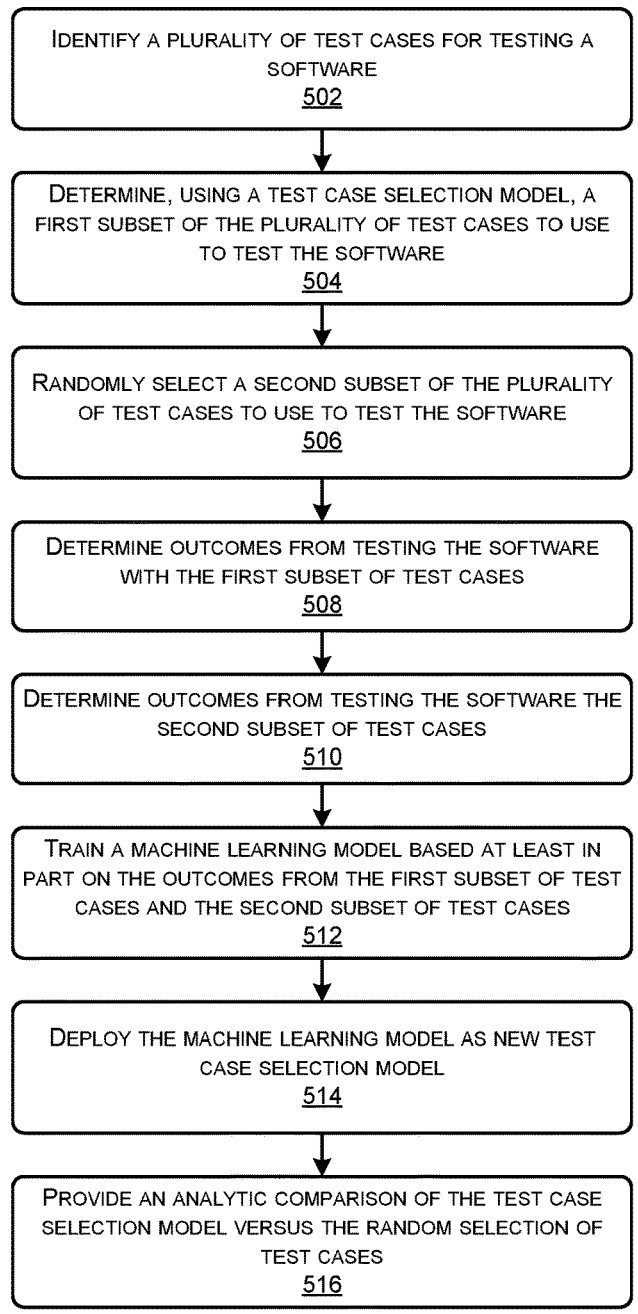
FIG. 5 illustrates a flow diagram of an example method to update a test case selection model with outcomes from software testing using machine learning, in accordance with example embodiments of the disclosure.

FIG. 5 illustrates a flow diagram of an example method 500 to update a test case selection model with outcomes from software testing using machine learning, in accordance with example embodiments of the disclosure. The method 500 may be performed by the test case selection system(s) 110, individually or in cooperation with one or more elements of environment 100, 200, 300.

At block 502, a plurality of test cases for testing a software may be identified. At block 504, a first subset of the plurality of test cases to use to test the software may be determined based at least in part on a test case selection model and input data. The input data, in this case, may be the data type 130. The test case selection model may be based on the weights 140, as disclosed herein. At block 506, a second subset of the plurality of test cases may be randomly selected to use to test the software.

At block 508, outcomes from testing the software with the first subset of test cases may be determined. The outcomes may indicate whether a bug was detected from testing using individual ones of the test cases of the first subset of test cases. The outcome information may be received from the testing entities, such as the automated testing system 154 and/or the game tester system 152. At block 510, outcomes from testing the software with the second subset of test cases may be determined. This process may be similar to that of block 508.

At block 512, a machine learning model may be trained based at least in part on the outcomes from the first subset of test cases and the second subset of test cases. The machine learning model may generate refined weights 140 to deploy as a new test case selection model. Although machine learning test case selection models, and related weights 140, are discussed in the context of regression modeling, it should be understood that any suitable type of machine learning model may be used to generate and/or refine the test case selection models, as described herein. Thus, the test case selection models may be trained using outcomes from previous rounds of testing. This training may be supervised, unsupervised, or partially supervised (e.g., semi-supervised). This training may include fitting the weights 140 to select the test cases producing bugs.

At block 514, the machine learning model may be deployed as a new test case selection model. In example embodiments, this may entail updating the weights 140 with new weights determined from the operations of block 512. At block 516, an analytical comparison of the test case selection model versus the random selection of test cases may be provided. This process may be optional and may include any variety of statistical comparison of the randomly selected test cases to the test case selection model selected test cases, as discussed herein.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
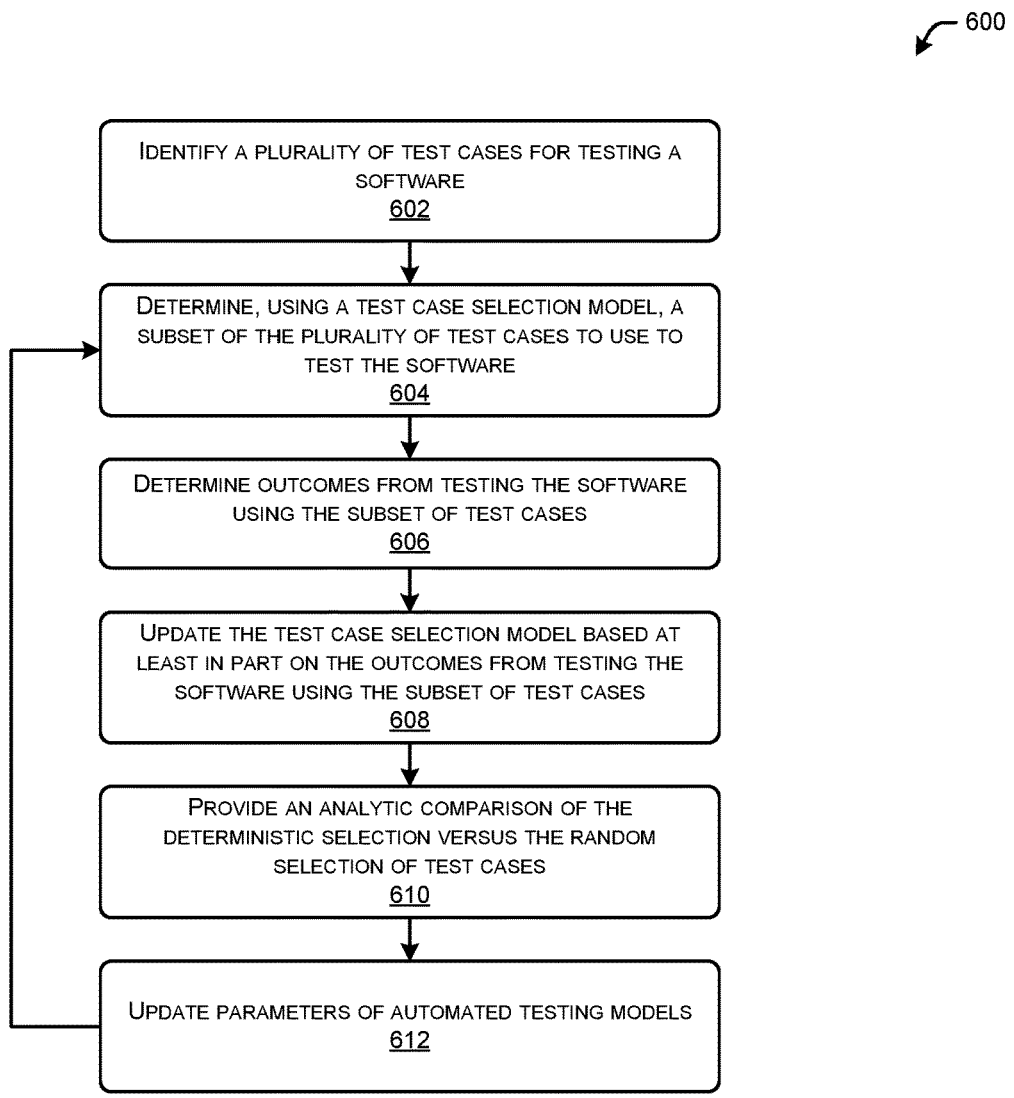
FIG. 6 illustrates a flow diagram of an example method to continuously update a test case selection model for selecting test cases to be tested, in accordance with example embodiments of the disclosure.

FIG. 6 illustrates a flow diagram of an example method 600 to continuously update a deterministic model for selecting test cases to be tested, in accordance with example embodiments of the disclosure. The method 600 may be performed by the test case selection system(s) 110, individually or in cooperation with one or more elements of environment 100, 200, 300.

At block 602, a plurality of test cases for testing a software may be identified. At block 604, a first subset of the plurality of test cases to use to test the software may be determined based at least in part on a test case selection model. The input data, in this case, may be the data type 130. The input data, in this case, may be the data type 130. The test case selection model may be based on the weights 140, as disclosed herein.

At block 606, the outcomes from testing the software using the subset of test cases may be determined. This outcome information may be received from the testing entities, such as the automated testing system 154 and/or the game tester system 152.

At block 608, the test case selection model may be updated based at least in part on the outcomes from testing the software using the subset of test cases. This process may involve using the outcomes from testing using the subset of test cases as training data for a machine learning model. Although machine learning test case selection models, and related weights 140, are discussed in the context of regression modeling, it should be understood that any suitable type of machine learning model may be used to generate and/or refine the test case selection models, as described herein. Thus, the test case selection models may be trained using outcomes from previous rounds of testing. This training may be supervised, unsupervised, or partially supervised (e.g., semi-supervised). This training may include fitting the weights 140 to select the test cases producing bugs.

At block 610, parameters of automated testing models may be updated. This operation may be optional. The parameters, as updated herein, may define the bounds and types of items to be performed during the automated testing. In some case, the machine learning models may learn that there is an opportunity to optimize one or more parameters associated with one or more of the test cases. When this happens, the identified parameters may be updated. In example embodiments, the method 600 may return back to 604, such that the test case selection models are updated periodically, such as after each QA testing run.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
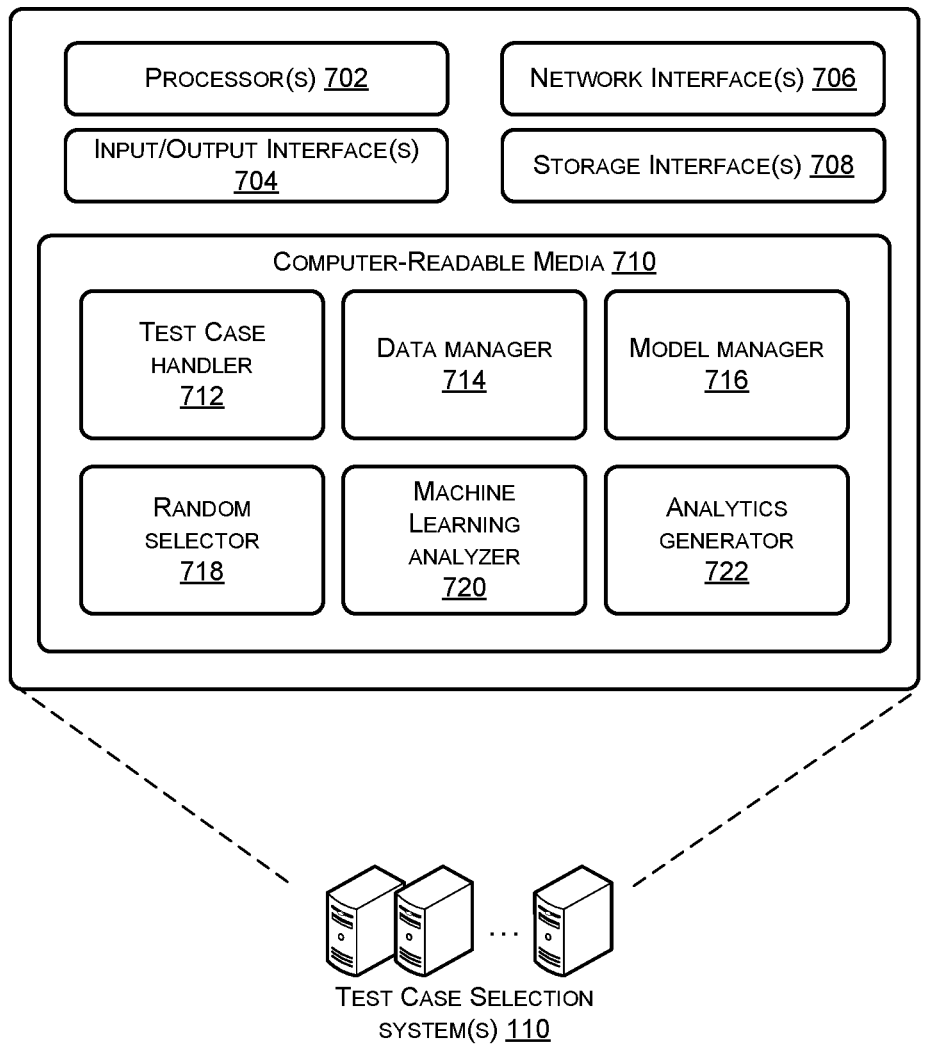
FIG. 7 illustrates a block diagram of example test case selection system(s) for selecting test cases, providing analytics, and/or updating test case selection model(s), in accordance with example embodiments of the disclosure.

FIG. 7 illustrates a block diagram of example test case selection system(s) 110 for selecting test cases, providing analytics, and/or updating test case selection model(s), in accordance with example embodiments of the disclosure. The test case selection system(s) 110 may include one or more processor(s) 700, one or more input/output (I/O) interface(s) 702, one or more communication interface(s) 704, one or more storage interface(s) 706, and computer-readable media 710.

In some implementations, the processors(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the test case selection system(s) 110 to detect interaction with a user and/or other system(s), such as the automated testing system 154 and/or the game tester system 152. The I/O interface(s) 702 may include a combination of hardware, software, and/or firmware and may include software drivers for enabling the operation of any variety of I/O device(s) integrated on the test case selection system(s) 110 or with which the test case selection system(s) 110 interacts, such as displays, microphones, speakers, cameras, switches, and any other variety of sensors, or the like.

The network interface(s) 704 may enable the test case selection system(s) 110 to communicate via the one or more network(s). The communications interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows test the case selection system(s) 110 to transition between various standards. The network interface(s) 704 may further enable the test case selection system(s) 110 to communicate over circuit-switch domains and/or packet-switch domains.

The storage interface(s) 706 may enable the processor(s) 700 to interface and exchange data with the computer-readable medium 710, as well as any storage device(s) external to the test case selection system(s) 110, such as the test case datastore 122.

The computer-readable media 710 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 710 may be implemented as computer-readable storage media (CRSM), which may be any available physical media accessible by the processor(s) 700 to execute instructions stored on the memory 710. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 700. The computer-readable media 710 may have an operating system (OS) and/or a variety of suitable applications stored thereon. The OS, when executed by the processor(s) 700 may enable management of hardware and/or software resources of the test case selection system(s) 110.

Several functional blocks having instruction, data stores, and so forth may be stored within the computer-readable media 710 and configured to execute on the processor(s) 700. The computer readable media 710 may have stored thereon a test case handler 712, a data manager 714, a model manager 716, a random selector 718, a machine learning analyzer 720, and an analytics generator 722. It will be appreciated that each of the functional blocks 712, 714, 716, 718, 720, 722, may have instructions stored thereon that when executed by the processor(s) 700 may enable various functions pertaining to the operations of the test case selection system(s) 110.

The instructions stored in the test case handler 712, when executed by the processor(s) 700, may configure the test case selection system(s) 110 to manage the test cases 120, such as storing and/or retrieving the test case datastore 122. New test cases 120 may be received and stored and/or managed.

The instructions stored in the data manager 714, when executed by the processor(s) 700, may configure the test case selection system(s) 110 to manage the weights 140 and/or the outcomes as received from performing the test cases 120. This data may be managed in a way to refine test case selection models, with their associated weights 140.

The instructions stored in the model manager 716, when executed by the processor(s) 700, may configure the test case selection system(s) 110 to store and use the test case selection models and/or the constituent weights of the models. The processor(s) 700 may further be able to update the weights 140 of the test case selection models based on training machine learning models, such as regression models.

The instructions stored in the random selector 718, when executed by the processor(s) 700, may configure the test case selection system(s) 110 to select random test cases for the purpose of ascertaining the performance of a QA manager generated and/or machine learning generated test case selection model.

The instructions stored in the machine learning analyzer 720, when executed by the processor(s) 700, may configure the test case selection system(s) 110 to perform the machine learning processes to update the weights 140 of the test case selection model used to select test cases to perform. The processor(s) 700 may be configured to use any suitable machine learning algorithm, such as regression modeling.

The instructions stored in the analytics generator 722, when executed by the processor(s) 700, may configure the test case selection system(s) 110 to identify the test cases to be performed and then provide those test cases to testing entities. The processor(s) 700 may also be configured to intake outcomes form the testing using the selected test cases.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A test case selection system, comprising:
one or more processors; and
one or more computer-readable media storing computer-executable instructions that, when executed by the one or more processors, cause the one or more processors to:
identify a plurality of test cases for testing a software application;
determine, based at least in part on a plurality of input data associated with the software application and a test case selection model defined by one or more weights associated with the input data, a first subset of the plurality of test cases for testing the software application;
select, by random selection, a second subset of the plurality of test cases for testing the software application;
receive a first set of outcomes associated with the first subset of the plurality of test cases;
receive a second set of outcomes associated with the second subset of the plurality of test cases; and
generate, based at least in part on the first set of outcomes and the second set of outcomes, a comparison between the test case selection model and the random selection of test cases.

2. The test case selection system of claim 1, wherein the test case selection model is a regression model, and wherein the weights are determined by a machine learning algorithm.

3. The test case selection system of claim 1, wherein to generate the comparison between the test case selection model and the random selection of test cases, the computer-executable instructions further cause the one or more processors to:
determine a first probability of detecting a bug from testing the software application using the first subset of the plurality of test cases; and
determine a second probability of detecting a bug from testing the software application using the second subset of the plurality of test cases.

4. The test case selection system of claim 1, wherein the computer-executable instructions further cause the one or more processors to:
 determine, based at least in part on a regression model, the first set of outcomes, and the second set of outcomes, a second set of one or more weights; and
 update the test case selection model with the second set of one or more weights as an updated test case selection model.

5. The test case selection system of claim 4, wherein the computer-executable instructions further cause the one or more processors to:
 determine, based at least in part on the updated test case selection model, a third subset of the plurality of test cases for testing the software application; and
 receive a third set of outcomes associated with the third subset of the plurality of test cases; and
 generate, based at least in part on the second set of outcomes and the third set of outcomes, a comparison between the test case selection model and the updated test case selection model.

6. The test case selection system of claim 1, wherein the computer-executable instructions further cause the one or more processors to:
 identify a particular test case from the first subset of the plurality of test cases that is to be allocated to an automated testing system; and
 send an indication of the particular test case to the automated testing system, wherein a particular outcome associated with the particular test case is received from the automated testing system.

7. The test case selection system of claim 6, wherein the computer-executable instructions further cause the one or more processors to:
 identify a testing parameter value associated with the particular test case;
 determine, based at least in part on the first set of outcomes, an updated testing parameter value; and
 update the particular test case with the updated testing parameter value.

8. The test case selection system of claim 1, wherein to receive the first set of outcomes associated with the first subset of the plurality of test cases, the computer-executable instructions further cause the one or more processors to:
 receive indications of whether a bug was detected from testing the software application using individual ones of the first subset of the plurality of test cases.

9. A test case selection method, comprising:
 determining, based at least in part on a plurality of input data associated with a software application and a test case selection model defined by first set of weights associated with the input data, a first subset of test cases selected from a plurality of test cases for testing the software application;
 sending an indication that the first subset of test cases are to be used to test the software application;
 receiving a first set of outcomes associated with the first subset of test cases, the first set of outcomes indicating a number of bugs detected as a result of the software application being tested with the first subset of test cases;
 determining, based at least in part on a regression model and the first set of outcomes, a second set of weights;
 updating the test case selection model with the second set of weights as an updated test case selection model;
 determining, by random selection, a second subset of test cases selected from the plurality of test cases for testing the software application;
 sending an indication that the second subset of test cases are to be used to test the software application;
 receiving a second set of outcomes associated with the second subset of test cases; and
 generating, based at least in part on the first set of outcomes and the second set of outcomes, a comparison between the test case selection model and the random selection of test cases.

10. The test case selection method of claim 9, further comprising:
 determining, based at least in part on the first set of outcomes, a first probability of detecting a bug from testing the software application using the first subset of test cases; and
 determining, based at least in part on the second set of outcomes, a second probability of detecting a bug from testing the software application using the second subset of test cases, wherein the comparison between the test case selection model and the random selection of test cases includes the first probability and the second probability.

11. The test case selection method of claim 10, further comprising:
 determining, based at least in part on the updated test case selection model, a third subset of test cases selected from the plurality of test cases for testing the software application; and
 receiving a third set of outcomes associated with the third subset of test cases; and
 generating, based at least in part on the second set of outcomes and the third set of outcomes, a comparison between the test case selection model and the updated test case selection model.

12. The test case selection method of claim 11, further comprising:
 determining, based at least in part on the regression model and the third set of outcomes, a third set of weights; and
 updating the updated test case selection model with the third set of weights as a second updated test case selection model.

13. The test case selection method of claim 9, wherein the first set of outcomes indicates which of the first subset of test cases resulted in a bug detection when used to test the software application.

14. A system, comprising:
 one or more processors; and
 one or more computer-readable media storing computer-executable instructions that, when executed by the one or more processors, cause the one or more processors to:
 receive a first set of outcomes associated with a first subset of test cases selected from a plurality of test cases to test a software application, the first set of outcomes indicating a number of bugs detected as a result of the software application being tested with the first subset of test cases;
 determine, based at least in part on the first set of outcomes, a set of weights associated with a test case selection model; and
 deploy the test case selection model by updating a prior set of weights with the set of weights;
 select, by random selection, a second subset of the plurality of test cases for testing the software application;

receive a second set of outcomes associated with the second subset of the plurality of test cases; and generate, based at least in part on the first set of outcomes and the second set of outcomes, a comparison between the prior set of weights and the random selection of test cases.

15. The system of claim 14, wherein the computer-executable instructions further cause the one or more processors to:

determine, based at least in part on the test case selection model, a second subset of test cases selected from the plurality of test cases;

instruct testing of the software application using the second subset of test cases;

receive a second set of outcomes associated with the second subset of test cases; and generate, based at least in part on the first set of outcomes and the second set of outcomes, a comparison between the set of weights and the prior set of weights.

16. The system of claim 15, wherein the computer-executable instructions further cause the one or more processors to:

determining, based at least in part on the second set of outcomes, a second set of weights associated with a second test case selection model; and deploy the second test case selection model by updating the set of weights with the second set of weights.

17. The system of claim 14, wherein the set of weights is based at least in part on the second set of outcomes.

18. The system of claim 14, wherein the first set of outcomes indicates which of the first subset of test cases resulted in a bug detection when used to test the application software.

19. The method of claim 9, further comprising:

identifying a particular test case from the first subset of the plurality of test cases that is to be allocated to an automated testing system; and sending an indication of the particular test case to the automated testing system, wherein a particular outcome associated with the particular test case is received from the automated testing system.

20. The system of claim 14, wherein the computer-executable instructions further cause the one or more processors to:

identify a particular test case from the plurality of test cases that is to be allocated to an automated testing system; and send an indication of the particular test case to the automated testing system, wherein a particular outcome associated with the particular test case is received from the automated testing system.

* * * * *